United States Patent Office 3,034,835
Patented May 15, 1962

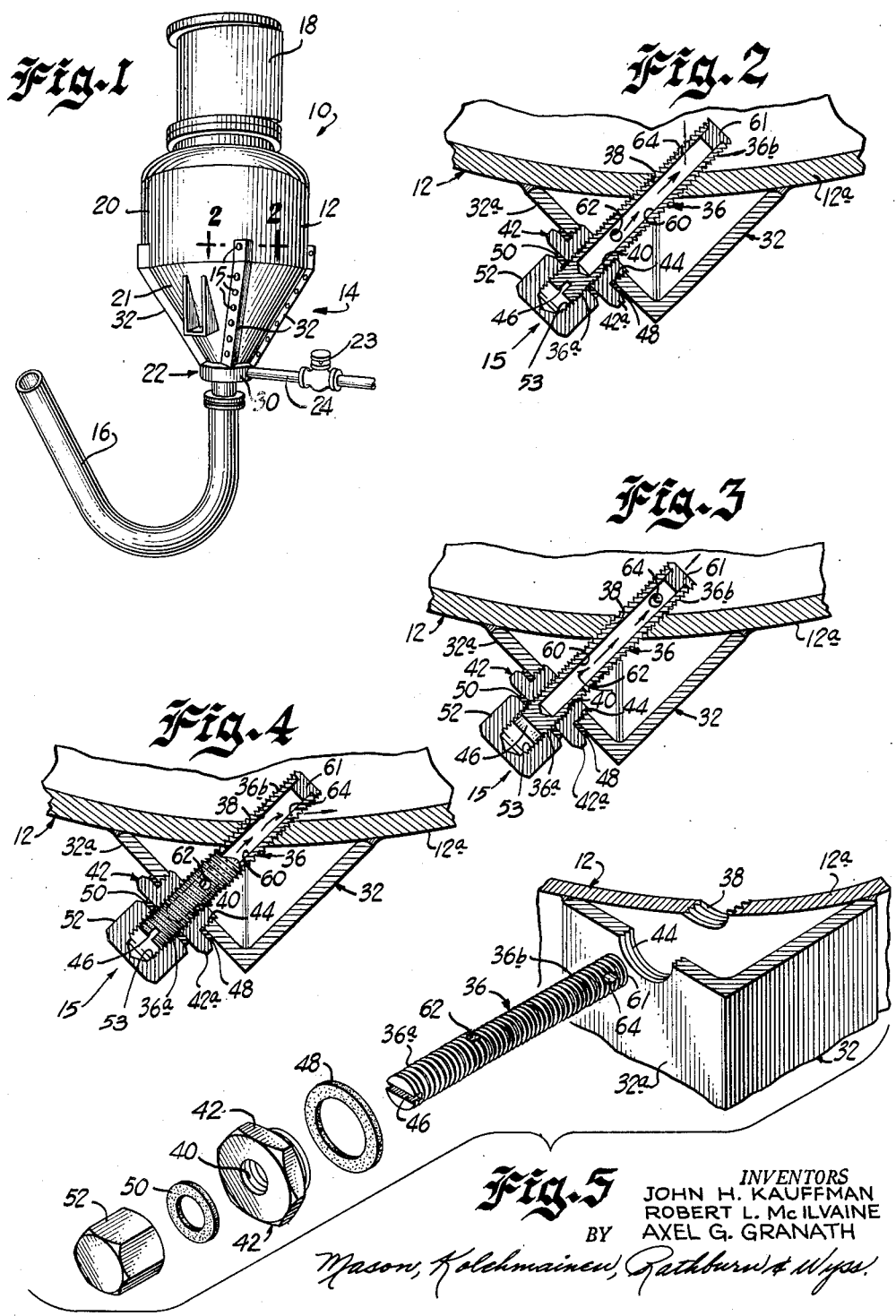

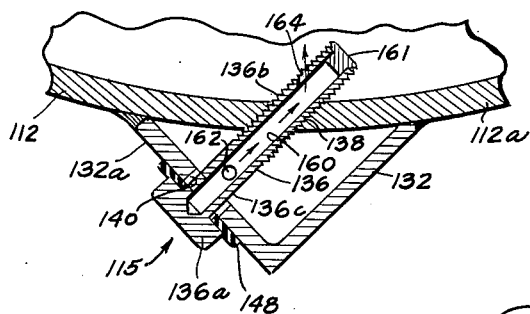
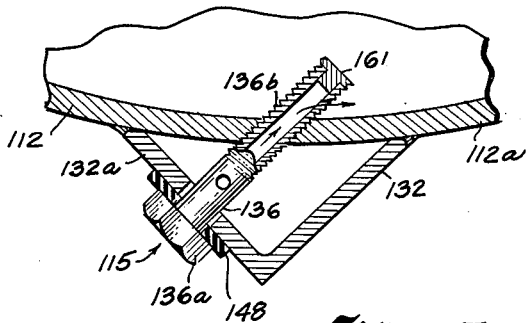
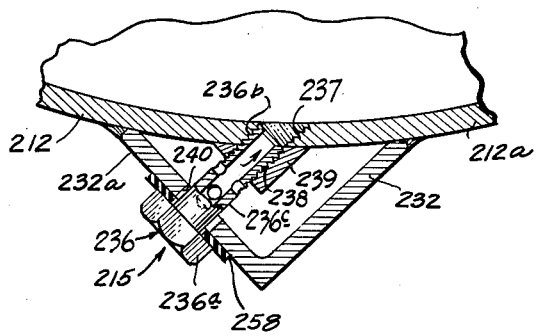

3,034,835
PNEUMATIC CONVEYOR APPARATUS
John H. Kauffman, Crystal Lake, Robert L. McIlvaine, Winnetka, and Axel G. Granath, Chicago, Ill., assignors to Herbert Simpson Corporation, Chicago, Ill., a corporation of Illinois
Filed Oct. 30, 1958, Ser. No. 770,636
9 Claims. (Cl. 302—53)

The present invention relates to pneumatic conveying equipment and, more specifically, to jet nozzle means for pneumatically moving granular materials to a conveyor apparatus.

In the foundry field, it is necessary that granular material, for example, sand, be conveyed or transported from a storage bin to a molding apparatus before a molding operation and then be conveyed or transported from the molding apparatus to suitable sand reclaiming equipment. For this purpose, pneumatic conveyor systems have been employed, i.e., systems in which compressed air or similar fluids under pressure have been used to move the foundry sand or other granular material through suitable conduits and the like. The compressed air is introduced into the conduits by suitable jet nozzles which develop air streams for moving the sand in a predetermined manner. In some installations, the jet nozzles are fixedly secured to the conveyor apparatus to direct the compressed air into the apparatus in only a single direction. These nozzles have the disadvantage that the direction of the compressed air stream cannot be altered as may be necessary when the apparatus is used to convey different types of granular material. In other installations, jet nozzles are adjustably supported from the conduits or the like but are only adjustable from within the conduit or the like. Accordingly, when it is desired to change the direction of the compressed air stream, it is necessary that the conveyor apparatus be shut down and disassembled in order to adjust the jet nozzles.

It, of course, would be desirable to provide a jet nozzle which could be adjustable to vary the direction of the compressed air stream within the conveyor apparatus but which would be accessible from outside of the conveying apparatus. Accordingly, it is the primary object of the present invention to provide a jet nozzle having this desirable characteristic.

It is another object of the present invention to provide for pneumatic conveyor apparatus a new and improved jet nozzle means operable to direct a medium under pressure into the conveying apparatus in one of a plurality of directions.

It is yet another object of the present invention to provide for a pneumatic conveyor apparatus an adjustable jet nozzle which is controllable from outside of the apparatus.

It is another object of the present invention to provide for a conveying apparatus a new and improved jet nozzle which is adjustable externally of the apparatus without interfering with the conveying function of the apparatus and which directs a medium under pressure into the conveying apparatus irrespective of the adjustable position of the nozzle.

It is a further object of the present invention to provide for a pneumatic conveying apparatus a plurality of adjustable jet nozzles adjustably supported from the conveying apparatus to direct a plurality of air streams into the conveyor apparatus in a selected pattern.

It is yet a further object of the present invention to provide for a pneumatic conveying apparatus a manifold containing a medium under pressure and having a plurality of trunks on which a group of jet nozzles are removably mounted for directing the medium into the apparatus at spaced locations.

The above and other objects are achieved in accordance with the present invention by providing a jet nozzle means adjustably supported from a pneumatic conveying apparatus for introducing a medium under pressure, for example, compressed air, into the conveyor apparatus in one of a plurality of directions. In installations embodying a plurality of jet nozzles, the nozzles may be so arranged to establish a predetermined pattern of compressed air streams within the conveyor apparatus. Each jet nozzle functions to convey the compressed air transported within a manifold through the wall of the apparatus, which manifold comprises a plurality of trunk manifolds secured to the wall of the apparatus. The jet nozzle comprises a tube rotatably supported from the walls of the manifold and apparatus so that its closed outer end is accessible from outside of the apparatus. The tube has a longitudinal passageway in communication with the manifold through an opening defined transversely of the tube. The compressed air is directed into the apparatus as a compressed air stream under the control of an outlet opening defined adjacent to the inner end of the tube. In one embodiment, the outlet opening is inclined relative to the passageway so that rotation of the tube effects a change in the direction of the air stream within the apparatus with the result that the effect of the air stream on the sand is substantially altered. The size of the air stream may also be controlled by using a selected one of a plurality of tubes having different sized inclined openings while the point at which the air stream enters the apparatus may be controlled by using a selected one of a plurality of tubes having different lengths.

Other objects and advantages of the present invention will become apparent from the following description of illustrative embodiments thereof, in the course of which reference is had to the accompanying drawings, wherein:

FIG. 1 is a perspective view of a pneumatic conveyor apparatus, illustrating the use of jet nozzle means embodying the features of the present invention;

FIG. 2 is an enlarged sectional view of the jet nozzle means of FIG. 1, illustrating one position of the jet nozzle;

FIG. 3 is a sectional view, similar to FIG. 2, illustrating a second position of the jet nozzle;

FIG. 4 is a sectional view, similar to FIGS. 2 and 3, illustrating a third position of the jet nozzle;

FIG. 5 is an exploded perspective view of the jet nozzle of FIG. 1;

FIG. 6 is a sectional view of another embodiment of the present invention, illustrating one position of the jet nozzle;

FIG. 7 is a sectional view of the jet nozzle of FIG. 6, illustrating another position of the jet nozzle; and FIG. 8 is a sectional view of yet another embodiment of the present invention.

Referring now to the drawings and particularly to FIG. 1, there is illustrated a portion of a pneumatic conveyor apparatus 10 used in a foundry for transporting foundry sand and other granular materials, finely divided solids, comminuted matter and the like between spaced apart stations within the foundry. The conveyor apparatus is a substantially closed pneumatic system and comprises a transporter 12 into which foundry sand is gravity fed and a discharge conduit 16 for transporting the foundry sand to either single or multiple stations located either above or below the transporter 12. The transporter 12 embodies a plurality of spaced jet nozzle means 14 for introducing into the transporter 12 a medium under pressure, for example, compressed air, thereby to accelerate the flow of sand through the transporter and into a discharge conduit 16.

The transporter includes a generally cylindrical hopper 18 into which granular material is fed either by gravity or by suitable conveyor equipment. The sand within the hopper 18 moves under the force of gravity into the cylindrical portion 20 of the transporter 12 under the control of a suitable control means (not shown). The sand within the cylindrical body portion 20 and the generally conical base 21 of the transporter 12 is exposed to severe air turbulence created by a predetermined pattern of air streams developed by the plurality of jet nozzle means located at different levels within the transporter 12. The jet means is adjustable and comprises a jet nozzle 15 and a manifold 22 which conveys the compressed air from a source (not shown) through a conduit 24 to a jet nozzle 15. By properly adjusting the jet nozzle means, the air streams cause the sand to be swirled about the transporter 12 such that clogging of the apparatus is substantially avoided.

Considering now the manifold 22 in greater detail, and referring to FIG. 1, it supplies compressed air from the source (not shown) to the jet nozzles 15 whenever a valve 23 in the conduit 24 is in its on position. The manifold 22 comprises an annular conduit 30 of channel section secured by welding or the like to the lowermost point on the conical base 21 so as to provide an air tight seal between the conduit and the transporter 12. The manifold 22 further includes four spaced apart manifold trunks 32 of triangular section secured by welding or the like to the outer wall of the transporter 12 thereby providing an air tight seal between the trunk manifolds 32 and the transporter 12. The trunks 32 are connected at their lower ends to the conduit 30 and extend upwardly along the walls of the conical base 21 to terminate on the lower part of the cylindrical portion 20, the upper ends of the trunks 32 terminating in end walls. By this arrangement, approximately the same air pressure is provided throughout the entire manifold 22 with the result that approximately the same air pressure is available at all of the jet nozzles 15.

A first embodiment of the jet nozzles 15 is shown in FIGS. 2, 3, 4 and 5. Each nozzle is detachably supported from the wall 12a of the transporter 12 and the wall 32a of the manifold 32 and produces one gas stream which is directed into the inside of the transporter 12 in a direction corresponding to the position of the jet nozzle 15. It comprises a tube 36 which is externally threaded throughout its entire length for reception within a tapped opening 38 defined in the wall of the transporter 12a and an aligned opening 40 provided in a hub 42, the hub 42, in turn, being threaded into a tapped opening 44 defined in the wall 32a of the trunk manifold 32. The outer end 36a of the tube 36 is closed and when the tube is in operative position in threaded engagement with the openings 38 and 40, the outer end 36a is located externally of the transporter 12. In order to effect an air tight seal between the tube 36 and the trunk manifold 32, an annular rubber gasket 48 is located between the shoulder portions 42a of the hub 42 and the outer surface of the wall 32a, while in order to effect an air tight seal between the cap 52 and the hub 42 an annular rubber gasket 50 is located between the outer surface of the hub 42 and the inner surface of a cap 52. The cap 52 includes an internally threaded bore 53 for accommodating the outer end 36a of the tube 36 and is threaded over the outer end 36a of the tube 36 into flush engagement with the gasket 50 so that even if a path for compressed air is provided between the tube and the hub the compressed air is confined within the cap 52. It will be appreciated that the gasket 48 is readily compressible by the hub 42 so that an air tight seal is obtained even though the hub is turned 360 degrees. It, of course, is necessary that the hub 42 be adjusted to bring the threads of the tapped openings 38 and 40 into registry or predetermined spaced relation so that the tube 36 may be threaded therein without binding or locking.

Referring now specifically to the tube passageway construction which transports the compressed air from the trunk manifolds 32 to the inside of the transporter, the tube includes a passageway 60 extending throughout substantially its entire length from its inner end 36b to a point spaced from its closed outer end 36a. The inner end 36b of the tube 36 is provided with a plug 61 so that the inner end of the passageway 160 is also closed. For the purpose of transporting the compressed air from the trunk manifold 32 to the passageway 60, a passage 62 extends transversely of the tube between the outer surface of the tube 36 and the longitudinal passageway 60. The passage 62 is located adjacent to the outer end 36a of the tube 36 to be exposed to the interior of the trunk manifold 32 when the tube 36 is in its operative position. The compressed air passes along the passageway 60 as shown by arrowed lines through the wall 12a of the transporter and into the inside of the transporter 12 through an outlet opening 64 which extends between the passageway 60 and the outer surface of the tube 36. The outlet opening 64 is located adjacent the inner end 36b of the tube 36 and is inclined relative to the passageway 60. As shown in FIG. 2, the opening 64 is directed radially inwardly of the transporter so that the air stream is discharged directly into the center of the transporter 12. It will be appreciated that as the tube 36 is turned, the outlet opening 64 assumes different positions relative to the transporter 12 and directs the compressed air stream into the transporter 12 in a plurality of different directions. Actually the air stream defines a cone of revolution during a single turn of the jet nozzle so that the air stream may be directed along any line on the surface of this cone.

In accordance with an important aspect of the present invention, the tube 36 extends outside of the transporter 12 and is accessible from without the transporter 12 by the simple expediency of removing the cap 52. In order to adjust the tube 36 to change the direction of the air stream, the outer end 36a of the tube 36 is provided with a slot extending transversely of the tube for receiving a screw driver or the like. Hence, by turning the tube 36 with the screw driver, the relative position of the inclined opening 64 changes and the direction of the air stream changes. It it is desired to direct the strea mof compressed air tangentially along the inner surface of the wall 12a of the transporter 12, then the cap 52 is unthreaded from the tube 36, the tube 36 turned 180 degrees from the position shown in FIG. 2 to the position shown in FIG. 4 by the screw driver and the cap 52 is threaded into the tube 36 into flush engagement with the gasket 50. Although the air tight seal between the cap 52 and the hub 42 is broken during adjustment of the jet nozzle 15, only an insignificant amount of air escapes between the tube 36 and the hub 42.

It should be understood that the cap 52 in addition to providing a sealing function, restrains the movement of the tube, thereby to maintain the outlet opening 64 in the position in which it is set. Specifically, the turning of the cap 52 when in engagement with the gasket 50 effects a binding or locking force between the threads of the cap 52 and the tube 36, which binding force is adequate to restrain the tube 36 from rotation during normal use of the transporter 12.

It will be appreciated that each jet nozzle 15 may be adjusted to assume any position on the cone of revolution intermediate the position shown in FIGS. 2 and 4, for example, a position 90 degrees displaced from the positions in FIGS. 2 and 4 as shown in FIG. 3. When the jet nozzle is in the position of FIG. 3, the compressed air is directed into the transporter at an angle 45 degrees to the horizontal and 45 degrees to the vertical so that the air stream is directed upwardly and to one side of the transporter 12.

Each jet nozzle 15 illustrated in FIG. 1 is constructed as described above and all are individually adjusted from outside of the transporter to effect a pattern of compressed air streams within the transporter in accordance with the type of foundry sand or granular material being transported by the pneumatic conveying apparatus.

For particular conveying problems, the pattern of air streams may be further varied by locating the outlet openings at different radial distances within the transporter. To this end, jet nozzles 15 having different tube lengths may be supplied with each transporter. Thus, if it is desired to have the air stream emanate at a point spaced from the wall 12a of the transporter instead of adjacent to the transporter wall, as shown in FIGS. 2, 3 and 4, the tube 36 is replaced by a tube having a longer length. The tube, of course, may be turned to direct the gas stream into the transporter 12 in any given direction as described above.

In addition, the size of the air stream developed by each jet nozzle may be increased or decreased. In this connection, there may be provided a plurality of jet nozzles having outlet openings of different size. In the event that a heavy type of foundry sand is being used, it is necessary that a large pneumatic force be applied to the transporter and, accordingly, a tube having a large sized outlet opening is used. On the other hand, if a lightweight foundry sand is used, a jet nozzle having a relatively small cross section is employed, thereby permitting the use of lower air pressures with the attendant increase in operating efficiencies.

In another embodiment of the jet nozzle shown in FIG. 6, the nozzle 115 comprises an externally threaded tube 136 provided with an externally threaded inner end 136b for engagement with a tapped opening 138 in the wall of the transporter 112 and a body portion 136c located within an oversized opening 140 defined in the wall 132a of the trunk manifold 132. As shown, the openings 138 and 140 are aligned so that when the inner end 136b of the tube threadedly engages the opening 138 the body 136c of the tube is disposed centrally of the opening 140. The outer end 136a comprises an enlarged hex-head which is adapted to be grasped by a wrench (not shown) or the like so that the tube 36 may be turned to move the tube 136 into or out of the opening 138.

In order to effect an air tight seal between the tube 136 and the trunk manifold 132, a gasket 148 is located between the under surface of the hex-head 136a and the outer surface of the wall 132a. The gasket 148 is made of a resilient material, preferably of rubber and is readily compressed between the hex-head 136a and the wall of the trunk manifold 132 incident to turning of the hex-head 136a. It is the inherent resiliency of the gasket 148 which permits the tube 136 to be turned one or two turns after the manifold 132, the gasket 148, and the hex-head 136a are in assembled relation while maintaining an air tight seal therebetween.

Referring now specifically to the tube passageway construction which provides for passage of the compressed air from the manifold trunks 132 to the inside of the transporter 112, the tube includes a passageway 160 extending throughout substantially its entire length from its inner end 136b to a point spaced from its outer end 136a. The inner end 136b of the tube 136 is provided with a plug 161 so that the inner end of the passageway 160 is also closed. For the purpose of transporting the compressed air from the trunk manifold 132 to the passageway 160, a passage 162 extends transversely of the tube between the outer surface of the tube 136 and the longitudinal passageway 160. The passage 162 is located adjacent to the outer end 136a of the tube to be exposed to the interior of the manifold trunk 132 when the tube 136 is in its operative position shown in FIG. 6. The compressed air passes along the passageway 160 as shown by arrowed lines through the wall 112a of the transporter and into the inside of the transporter 112 through an outlet opening 164 which extends between the passageway 160 and the outer surface of the tube 136. The outlet opening 164 is located adjacent the inner end 136b of the tube and is inclined relative to the passageway 160. As described above in connection with the first embodiment, the outlet opening 164 assumes different positions relative to the transporter and directs the compressed air stream into the transporter in a plurality of different directions incident to turning of the tube 136.

In a manner similar to the first embodiment, the tube 136 extends outside of the transporter 112 so that its hex-head 136a is accessible from without the transporter 112. The direction of the air stream is changed by turning the hex-head 136a with a wrench so that the relative position of the inclined opening 164 is changed as described above. If it is desired to direct the stream of compressed air tangentially along the inner surface of the wall 112a of the transporter 112, the tube 136 is turned 180 degrees from the position shown in FIG. 6 to the position shown in FIG. 7. Even though the tube 136 is displaced by an amount equal to one-half the pitch of the threads during the half turn of the tube 136, the hex-head 136a and the gasket 148 do not bind and the air tight seal is retained because of the inherent resiliency of the rubber gasket 148.

A third embodiment of the jet nozzle is illustrated in FIG. 8. The jet nozzle 215 is generally similar to the above-described jet nozzle 115 in that it comprises a tube 236 having a hex-head outer end 236a. The tube 236 includes a body portion 236c adjacent to the hex-head 236a and an inner threaded end portion 236b which, in contrast to the nozzle 115 does not extend into the transporter 212. The inner end portion 236b is threadedly received within both a tapped opening 237 in the wall 212a of the transporter 212 and a tapped opening 238 defined in a support member 239 which is suitably secured by welding or the like to the outer surface of the wall 212a. As shown, the body portion 236c is disposed centrally of an over-sized opening 240 defined in the wall 232a of the manifold 232 secured to the transporter wall 212a by welding or the like. Similar to the jet nozzle 115, a rubber gasket 258 is disposed between the under surface of the hex-head 236a and the outside surface of the trunk manifold wall 232a.

The passageway construction of the tube 236 differs from the passageway construction of the jet nozzles 115 and 215 principally in that an unobstructed passageway 260 extends longitudinally of the tube 236 from its inner end 236b to a point spaced from its outer hex-head 236c. In contrast to the above-described jet nozzles, the passageway 260 communicates directly with the inside of the transporter and no plug and no inclined outlet opening are provided in the inner end 236b of the tube 236. As shown, the extreme inner end of the passageway 260 is flared in contrast with the extreme inner ends of the inclined passageways 64 and 164 described above. Accordingly, the compressed air admitted into the passageway 260 through a pair of transverse openings 262 is directed into the transporter 212 from the end of the jet nozzle 215 along its longitudinal axis.

It will be appreciated, of course, that in accordance with the above described embodiments, the inner end of the passageway 260 instead of being flared could be provided with an inclined terminated portion so that the air stream enters the transporter 212 in a direction inclined relative to the longitudinal axis of the tube 236. Thus, the direction of the air stream may be adjusted by turning the hex-head 236a.

While the present invention has been described in connection with particular embodiments of the invention, it will be understood that various modifications may be made thereon which are within the true spirit and scope of the invention as defined in the appended claims.

What is claimed as new and desired to be secured by Letters Patent of the United States is:

1. In a pneumatic conveyor system, a transporter for housing granular material, manifold trunk means supported from said transporter for containing a medium under pressure and having a portion of its wall common with a portion of the wall of said transporter, and a jet means including a hollow tube supported from both the above said portion of the common wall and from another wall portion of said manifold trunk means and partially extending into said transporter, said tube including a passageway extending longitudinally of the tube, an opening communicating with said manifold trunk means between the passageway and the surface of the tube for providing passage of the medium from said manifold trunk means to said passageway, and an outlet opening angularly related to and in communication with said passageway for discharging said medium into said transporter, said outlet opening discharging said medium into said transporter in different directions incident to rotation of said tube.

2. The apparatus of claim 1 wherein one end of the tube extends outside of said manifold trunk means and is accessible from outside of both the transporter and manifold trunk means so that the tube may be rotatably adjusted to discharge said medium into said transporter in a selected one of said directions.

3. In a pneumatic conveyor, a transporter for housing granular material, a manifold supported by said transporter for containing a medium under pressure, said manifold including a base portion in communication with a source of said medium and a plurality of trunk manifolds extending away from said base portion along the wall of said transporter, said transporter and said trunk manifolds having wall portions common to each other, and a plurality of jet means adjustably supported both from said common wall portions of said trunk manifold and said transporter and from other wall portions of said trunk manifolds.

4. In a pneumatic conveyor system, a transporter of circular cross section for housing granular material, a manifold supported from said transporter for containing a medium under pressure, and a jet means including a hollow tube supported from both said transporter and said manifold and inclined oblique to a radial line of said circular cross section, said tube including a passageway extending longitudinally of the tube and communicating with said transporter, an opening communicating with said manifold between the passageway and the surface of the tube for providing passage of the medium from said manifold to said passageway, said medium discharging from said passageway into said transporter.

5. In a pneumatic conveyor system, a transporter for housing granular material, a manifold one side of which is formed by a portion of the wall of said transporter, said manifold containing a medium under pressure, and a jet means including a hollow tube supported by said one side of said manifold and a second side of said manifold, said tube including a passageway extending longitudinally of the tube and communicating with said transporter, an opening extending into said manifold between the passageway and the surface of the tube for providing passage of the medium from said manifold to said passageway, said medium discharging through said passageway into said transporter.

6. In a pneumatic conveyor system, a transporter for housing granular material, a manifold supported by said transporter for containing a medium under pressure, said manifold including a base portion in communication with a source of said medium, and a plurality of triangularly shaped trunk manifolds extending away from said base portion along the wall of said transporter, one side of said trunk manifolds being formed by a portion of the wall of said transporter, and a plurality of jet means adjustably supported from said one side of said trunk manifolds and another side of said trunk manifolds.

7. The apparatus of claim 5 wherein said manifold is of triangular cross section.

8. The apparatus of claim 7 wherein said hollow tube is threadedly engaged with at least one of said sides of said manifold and additionally includes means accessible from outside of both said transporter and said manifold for rotating said tube to facilitate adjustment and replacement thereof.

9. The apparatus of claim 8 wherein said tube is externally threaded throughout its length and is threadedly engaged with both of said sides of said manifold and with one end thereof extending outside of said second side of said manifold and accessible from outside of said manifold.

References Cited in the file of this patent

UNITED STATES PATENTS

| | | |
|---|---|---|
| 2,115,023 | Kennedy | Apr. 26, 1938 |
| 2,673,125 | Squire | Mar. 23, 1954 |
| 2,785,928 | Hanson | Mar. 19, 1957 |
| 2,794,686 | Anselman | June 4, 1957 |